United States Patent Office 3,780,137
Patented Dec. 18, 1973

3,780,137
METHOD FOR SEPARATING NICKEL CONTAMINANT FROM HYDROGENATED CONJUGATED DIENE POLYMERS
Howard L. Hassell, San Leandro, Calif., assignor to Shell Oil Company, New York, N.Y.
No Drawing. Filed Aug. 30, 1971, Ser. No. 176,297
Int. Cl. C08d 5/02; C08f 27/24
U.S. Cl. 260—880 B                    7 Claims

ABSTRACT OF THE DISCLOSURE

A method is provided for removing nickel contamination from organic polymers by contacting them with gaseous carbon monoxide at temperatures from about −20° to +200° C. to form nickel carbonyl, then volatilizing the nickel carbonyl from the polymer. Optionally, hydrogen sulfide may also be present in the carbon monoxide to promote carbonylization of nickel compounds.

BACKGROUND OF THE INVENTION

This invention is concerned with a method for removing nickel catalyst residues from polymers by treatment with carbon monoxide to form nickel carbonyl, which is volatilized and removed with the excess carbon monoxide.

The hydrogenation of unsaturated polymers is well known in the prior art. Usually a solution of polymer in an inert solvent is contacted at elevated temperature with hydrogen under pressure in the presence of a heavy metal catalyst, which is often a transition metal catalyst such as nickel, cobalt, iron, platinum and the like. Specific techniques are described in British Pat. 1,020,720. Nickel is a particularly useful and efficient hydrogenation catalyst, especially in the form of nickel compounds activated by special reduction methods.

Unsaturated polymers are hydrogenated or otherwise treated for a variety of reasons, frequently using a nickel catalyst. The presence of olefinic double bonds in the polymers makes them susceptible to oxygen attack and to deterioration by actinic radiation; saturation of olefinic double bonds greatly improves environmental stability. Hydrogenation may improve color. Polyethylene has been produced by hydrogenation of elastomeric polybutadiene (Ind. and Eng. Chem. 45, 1117–22 (1953), and Rubber Chem. and Tech. 35, 1052 (1962). In certain block copolymers or homopolymers resistance to flow under stress when hot is improved by hydrogenating the aromatic rings to alicyclic rings.

A common problem shared by all of these types of hydrogenated polymers is the deleterious effect of nickel catalyst remaining after hydrogenation. The quantity of metal to be removed may be as high as 5%w although substantially smaller amounts usually are present. The nickel discolors the product and may cause polymer deterioration by promoting reactions with air and actinic radiation; it must therefore be removed almost completely. Filtration may be carried on first to remove much of the catalyst but residual contamination is very difficult to remove by purely physical separation; chemical reaction and separation are required. Furthermore, especially with highly viscous polymer solutions filtration often is an impractical means of removing even gross amounts of nickel.

After the hydrogenation reaction to remove the double bonds in the polymer, the nickel catalyst is believed to be in a lower valence state, mostly in the zero valence state. Among other methods, vigorous chemical reactions have been proposed to convert the nickel to a salt by treatment with strong acids such as hydrochloric or sulfuric acid, but these agents are corrosive to the equipment used and, unless removed completely, may be deleterious to the hydrogenated polymer from which the nickel is being removed. Furthermore, an aqueous phase is necessary which must be intimately mixed with the organic phase containing the hydrogenated polymer, then separated cleanly to to remove the dissolved nickel ion. Such separation can often be a tedious process because of slow or incomplete separation of the two phases, i.e., because of emulsion formation.

Nickel has been refined by the so-called Mond metallurgical process by conversion to nickel carbonyl and subsequent reconversion to nickel metal by heating. The purpose of the Mond process is to refine nickel by removing it from copper and other metals in an alloy of high nickel content. The environment is entirely inorganic and no polymers are involved.

OBJECTS OF THE INVENTION

It is an object of this invention to provide an improved method of separating nickel contaminant from organic polymers. It is also an object of this invention to provide an improved method of removing nickel residues from organic polymers by treatment with carbon monoxide and optionally, hydrogen sulfide, to form nickel carbonyl and then volatilizing the nickel carbonyl to separate it from the polymer. Other objects will become apparent during the following detailed description of the invention.

STATEMENT OF THE INVENTION

Now, in accordance with this invention, a two-step method is provided for treating a nickel-contaminated hydrocarbon polymer, said method comprising the steps of
  (a) contacting said polymer with gaseous carbon monoxide to form nickel carbonyl, then
  (b) separating said nickel carbonyl from the polymer by volatilization at temperatures from −20° C. to +200° C.

Also, in accordance with this invention from about 0.001 to 10% by volume of hydrogen sulfide gas may be present in the carbon monoxide in both steps (a) and (b) to aid nickel carbonyl formation.

Polymers may become contaminated with nickel or nickel compounds in several ways. Incidental or accidental contamination may occur, from contact with reaction vessels or piping made from metals containing nickel, such as stainless steel or Inconel. Polymerization using nickel compounds as in the preparation of polybutadiene with nickel/aluminum type catalyst systems, or hydrogenation of polymers using nickel catalysts or other processes will generate polymers containing small amounts of deleterious nickel that must be removed. The nickel contained in all of these polymers will be removed by the method of this invention, and the invention is not limited by the previous history of the polymers or by the mode whereby the nickel contaminant entered the polymer.

The method of this invention is very useful in removing either gross or trace amounts of nickel from unsaturated polymers that have been hydrogenated in the presence of a nickel catalyst. Hydrocarbon polymers of olefinically unsaturated monomers which may be hydrogenated with nickel-containing catalysts include especially homopolymers, random copolymers or block copolymers of conjugated dienes and monovinyl arenes. Typical monomers include butadiene, isoprene, styrene and alpha-methyl styrene. Hydrogenation of block copolymers (either linear or branched) is especially contemplated. Typical polymers include polyisoprene, polybutadiene, polystyrene, butadiene-styrene random copolymers, polystyrene-polybutadiene-polystyrene block copolymers and their analogs.

These unsaturated polymers may be hydrogenated partially or selectively or completely by techniques known to the art, using nickel-containing catalysts and elevated temperatures and hydrogen under pressure. The catalysts may be, for example, nickel on kieselguhr, Raney nickel, and other forms of finely divided nickel produced by reduction of nickel compounds with various chemicals. Nickel on kieselguhr may be used, particularly if it has been activated at elevated temperatures by passing hydrogen over it for a period of several hours.

A particularly useful type of catalyst is made by reducing a compound of nickel with an aluminum or tin containing reducing agent. An example is a reaction product of nickel acetate with triethyl aluminum. Nickel and cobalt salts of alkanoic acids with from 1 to 12 carbon atoms are particularly suitable as are nickel chelates, such as nickel acetylacetonate and the like. Organometallic and inorganic reducing agents may be such agents as aluminum triisobutyl, lithium aluminum hydride, aluminum hydride and aluminum powder. A suitable process is described in Canadian Pat. 815,575.

Typical hydrogenated polymers containing metal catalyst that benefit from the method of this invention are hydrogenated polybutadiene, hydrogenated polyisoprene, hydrogenated polystyrene, hydrogenated random styrene-butadiene copolymers and hydrogenated arene-diene block copolymers.

It will be understood that the preparation of nickel catalyst, the conditions of hydrogenation and the degree of hydrogenation are not a part of this invention, and are not important to it. Patents pertaining to these matters include U.S. 3,333,024; U.S. 3,431,323; U.S. 3,465,063; and Canadian 815,575.

When hydrogenation is finished, the nickel catalyst exists in the system as a finely divided solid that is insoluble in the inert solvent, usually a hydrocarbon, used for the hydrogenation. The hydrogenation polymer may be in solution, or it may be partially precipitated if the polymer structure is such that it partially crystallizes; for example, a hydrogenated polystyrene-polyisoprene-polystyrene is soluble in a cyclohexane hydrogenation solvent, but a hydrogenated cis 1,4-polybutadiene is a crystalline polyethylene that may be only partly soluble at room temperature, but is soluble above about 100° C.

Filtration may remove much of the metal catalyst from the hydrogenation product, but the remaining deleterious quantity, usually of the order of 1 to 500 p.p.m. based on the hydrogenated polymer, is difficult to remove.

If the contaminating nickel is not removed, the hydrogenated polymer often has poor color, which worsens during heating or upon aging. The nickel may act as a pro-oxidation catalyst during subsequent polymer processing or long term aging, and may sensitize the polymer to actinic radiation.

In the method of this invention the nickel catalyst residue is believed to be converted to nickel carbonyl which is separated from the solution or slurry of polymer or dry polymer by volatilization. The method of this invention comprises (A) Treating the solution or slurry of polymer with carbon monoxide and, optionally, hydrogen sulfide to form nickel carbonyl, then (B) Separating the nickel carbonyl from the polymer by volatilization at temperatures at which the nickel carbonyl is not to any great extent decomposed.

If desired, the nickel carbonyl may be decomposed in a later step by heating at 140–200° C. and ordinary pressures, so that the carbon monoxide may be recycled.

While being treated the polymer containing nickel contaminant may be in the form of a polymer solution, or it may be a slurry of polymer in solvent. The solvent is usually an inert hydrocarbon. The carbon monoxide gas may be introduced at pressures from atmospheric pressure to a pressure of about 3,000 pounds per square inch (p.s.i.g.), but preferred pressures are from 50 to 1,000 p.s.i.g. Temperatures during contacting may range from 0° C. to about 250° C., but preferred temperatures are from 40° C. to 100° C. The duration of contact between the polymer and carbon monoxide may range from 0.1 to 24 hours, preferably 0.25–2 hours.

The formation of nickel carbonyl is a reversible reaction influence especially by temperature and pressure. The nickel carbonyl forms readily at moderate temperatures below 100° C. but decomposes again readily at 140–200° C. Reaction conditions must therefore be selected very carefully so that the nickel carbonyl is formed at a good rate and removed either at temperatures above its boiling point or by sparging with an inert gas. Higher contacting temperatures may be used if the carbon monoxide pressure is high. These several factors of time, temperature and pressure must be considered when conducting the nickel removal process of this invention.

Inclusion of a small percentage of hydrogen sulfide in the carbon monoxide gas will improve the efficiency of the removal process when nickel metal is present and especially when the nickel is present as a nickel compound. The contaminating nickel in some hydrogenation products or in polymers made using nickel polymerization catalysts may not all be in the metallic or zero valence state, but some of it may exist as soluble nickel compounds that do not react readily with carbon monoxide. When such a condition exists, the carbon monoxide gas used for treatment may contain 0.001 to 10% by volume of hydrogen sulfide gas, which is believed to convert the nickel compounds or nickel to nickel sulfide, which then reacts readily with carbon monoxide to form nickel carbonyl.

A large excess of carbon monoxide of at least 500 mol percent should be used; that is, considerably more than the stoichiometric quantity needed to react with the contaminating nickel in the product. The rate and completeness of reaction with nickel is thereby aided.

Treatment may be carried out at atmospheric pressure by sparging carbon monoxide gas continuously through a polymer cement, thus carrying away the nickel carbonyl continuously. Alternatively, the carbon monoxide may be introduced under pressure into an autoclave containing hydrogenation product in cement or slurry form, and treatment may be with or without agitation. After contacting for the necessary time, the pressure is released to remove the carbon monoxide and with it the nickel carbonyl. Multiple pressuring and depressuring with carbon monoxide also aids reaction and removal of the nickel. The carbon monoxide also functions as an entraining gas to carry away the nickel carbonyl.

Since nickel carbonyl boils at 43° C. under atmospheric pressure, any remainder not carried away by the carbon monoxide may be removed by warming the hydrogenation product to above 50° C. and/or by applying a vacuum to the system. Purging with nitrogen gas or steam distillation may also be used to remove the remaining small amounts of nickel carbonyl.

The following examples illustrate the manner in which the invention may be carried out. The examples are for purposes of illustration and the invention is not to be regarded as limited by any of the specific compounds or polymers or to the conditions recited.

EXAMPLE I

A nickel catalyst was prepared by adding cyclohexane solutions of nickel octoate and aluminum triethyl to enough cyclohexane to make a product containing 234 p.p.m. of nickel. The nickel octoate/aluminum triethyl molar ratio was 2.86. Carbon monoxide was bubbled through this suspension for one hour at 60–75° C. at atmospheric pressure. After storage overnight at room temperature, the solution was purged with nitrogen for several minutes.

The treated solution was analyzed and shown to contain only 40 p.p.m. nickel; 83% of the nickel had been removed.

EXAMPLE II

Using the techniques of British Pat. 1,020,720, a 4.5% solution of polystyrene-polybutadiene-polystyrene block copolymer in cyclohexane was hydrogenated with a nickel catalyst formed by reducing nickel octoate with aluminum triethyl. The hydrogenation product contained 633 p.p.m. of nickel (dry polymer basis).

After purging the hydrogenated polymer cement with carbon monoxide at room temperature and 400 p.s.i.g. in the hydrogenation vessel, carbon monoxide was compressed into the vessel to 700 p.s.i.g.; the temperature was raised to 100° C. for 30 minutes. After cooling the reaction product to 25° C., the pressure of carbon monoxide containing nickel carbonyl was carefully reduced to atmospheric pressure.

Analyses of the hydrogenated product showed that the nickel content was reduced from 633 p.p.m. to 202 p.p.m. (dry polymer basis) by the treatment. Removal in the single treatment was thus 68%.

I claim as my invention:

1. A method of treating hydrocarbon solutions of hydrogenated polymers of conjugated dienes, said solutions being contaminated with residues of nickel hydrogenation catalysts comprising nickel in zero valence state comprising the steps of
   (a) contacting said polymer solution with a gas selected from the group consisting of carbon monoxide and mixtures of carbon monoxide with no more than 10% by volume of hydrogen sulfide at 0–250° C. and atmospheric to 3,000 p.s.i.g. pressure for 0.1–24 hours, then
   (b) separating the nickel carbonyl so formed from the polymer solution by volatilization at temperatures between about 50° C. and about 150° C.

2. A method according to claim 1 wherein the polymer is a hydrogenated block copolymer of a conjugated diene and a mono alpha alkenyl arene.

3. A method according to claim 1 wherein the polymer is a hydrogenated polystyrene-polybutadiene-polystyrene block polymer.

4. A method according to claim 1 wherein hydrogen sulfide is 0.001 to 10% by volume of the gas mixture.

5. A method according to claim 1 wherein the nickel carbonyl is separated from the polymer at temperatures between about 75° C. and about 125° C.

6. A method according to claim 1 wherein the hydrogenation catalyst is the reaction product of a nickel alkanoate and organoaluminum reducing agent.

7. A process according to claim 6 wherein the catalyst is the reaction product of nickel octoate and aluminum triethyl.

References Cited
UNITED STATES PATENTS

| | | | |
|---|---|---|---|
| 2,756,194 | 7/1956 | Mayland | 260—95 |
| 3,300,464 | 1/1967 | Dietz | 260—94.9 F |
| 3,531,448 | 9/1970 | Johnson | 260—94.9 H |
| 3,644,588 | 2/1972 | Hassell | 260—880 |
| 3,673,281 | 6/1972 | Bronstert et al. | 760—880 |

JAMES A. SEIDLECK, Primary Examiner

U.S. Cl. X.R.

260—85.1, 94.7 H, 96 HY